United States Patent [19]

Hamada et al.

[11] Patent Number: 5,367,028
[45] Date of Patent: Nov. 22, 1994

[54] GOLF BALL

[75] Inventors: Akihiko Hamada, Kakogawa; Kuniyasu Horiuchi, Kobe; Akira Kato, Nishinomiya, all of Japan

[73] Assignee: Sumitomo Rubber Industries, Ltd., Hyogo, Japan

[21] Appl. No.: 942,456

[22] Filed: Sep. 9, 1992

[30] Foreign Application Priority Data

Sep. 9, 1991 [JP] Japan ................................. 3-258554

[51] Int. Cl.$^5$ ............................................. C08L 33/02
[52] U.S. Cl. ..................................... 525/221; 524/908
[58] Field of Search ................ 524/908, 513; 525/221, 525/173; 273/235 K

[56] References Cited

U.S. PATENT DOCUMENTS

| | | | |
|---|---|---|---|
| 4,483,537 | 11/1984 | Hanada et al. | 524/432 |
| 4,806,588 | 2/1989 | Fujimoto et al. | 524/505 |

FOREIGN PATENT DOCUMENTS

| | | |
|---|---|---|
| 0146965 | 7/1985 | European Pat. Off. . |
| 49-49727 | 5/1974 | Japan . |

*Primary Examiner*—Edward Cain
*Attorney, Agent, or Firm*—Birch, Stewart, Kolasch & Birch

[57] ABSTRACT

A golf ball having excellent durability as well as excellent impact resilience and suitable hardness, comprises a core and a cover for covering the core, wherein a heated mixture of an ionomer resin and a thermoplastic resin containing an oxazoline group is used as a main component of a base resin for the cover.

13 Claims, No Drawings

GOLF BALL

FIELD OF THE INVENTION

The present invention relates to a golf ball.

BACKGROUND OF THE INVENTION

As a base resin for a cover of a golf ball, an ionomer resin has widely been used (e.g. Japanese Patent Kokai No. 49-49727, etc.), heretofore.

The golf ball coated with the ionomer resin cover is hardly injured and is superior in durability to hitting and, further, it has excellent impact resilience and flying performance and, therefore, the ionomer resin has been highly estimated that it has well-balanced properties as the base resin for the cover.

However, demands of golfers for the golf ball have become higher and higher, and it has been strongly been requested that hit feeling of the golf ball is further improved without affecting other properties.

In order to obtain a golf ball having good hit feeling, it is necessary to use a softer core. However, the core becomes soft, deformation of the ball on hitting becomes large and durability of the ball is remarkably deteriorated. It is therefore difficult to practically use the golf ball.

Therefore, a stronger cover which inhibits deterioration of durability is required. Heretofore, selection of the ionomer resin and blending of the ionomer resin with other polymers have been studied, however, satisfactory results are not obtained at present.

OBJECTS OF THE INVENTION

Under these circumstances, the present inventors have intensively studied. As a result, it has been found that a golf ball having excellent durability as well as excellent impact resilience and suitable hardness can be obtained, by using a mixture produced by mixing an ionomer resin and a thermoplastic resin containing an oxazoline group with heating as a main component of the base resin of the cover, and the present invention has been completed.

Main object of the present invention is to provide a golf ball having excellent durability as well as excellent impact resilience and suitable hardness.

This object as well as other objects and advantages of the present invention will become apparent to those skilled in the art from the following description.

SUMMARY OF THE INVENTION

According to the present invention, there is provided a golf ball comprising a core and a cover for covering the core, a base resin of said cover being composed of a heated mixture of an ionomer resin and a thermoplastic resin containing an oxazoline group as a main component.

DETAILED DESCRIPTION OF THE INVENTION

The thermoplastic resin containing the oxazoline group is mixed with the ionomer resin with heating, the oxazoline group of the thermoplastic resin reacts with a carboxyl group of the ionomer resin, and the thermoplactic resin containing the oxazoline group is grafted on the surface of the ionomer to form a compatible mixed system wherein the thermoplastic resin containing the oxazoline group is micro-dispersed in the ionomer resin, i.e. "polymer alloy". This "polymer alloy" synergistically improves physical properties and, therefore, toughness of the ionomer resin is further improved. As a result, durability of the golf ball is improved and, further, impact resilience and hardness are also improved.

Accordingly, even if a soft core is used, remarkable deterioration of durability does not arise and impact resilience and hardness are suitably maintain, whereby a golf ball having an excellent hit feeling can be obtained without affecting other properties.

The ionomer resin is a resin of a copolymer comprising 10 to 20% by weight of $\alpha$, $\beta$-unsaturated carboxylic acid having 3 to 8 carbon atoms and 80 to 90% by weight of $\alpha$-olefin, a part of a carboxyl group in said copolymer being neutralized with a metal ion.

In the present invention, the ionomer resin may be any one which is used for the cover of the golf ball, and one or more sorts of them can be used in combination.

Example of the ionic ethylene-methacrylic acid copolymer based ionomer resin include HI-MILAN 1605 (of the type neutralized by sodium ion), HI-MILAN 1706 (of the type neutralized by zinc ion), HI-MILAN 1707 (of the type neutralized by sodium ion), HI-MILAN 1705 (of the type neutralized by zinc ion) which are commercially available from Mitsui Du Pont Polychemicals Co.; SURLYN 7930 (of the type neutralized lithium ion), SURLYN 7940 (of the type neutralized by lithium ion) which are commercially available from Du Pont de Nemours & Co. and the like.

Examples of the ionic ethylene-acrylic acid copolymer based ionomer resin include one that is commercially available from EXXON Co. under the trade name of Iotek.

As the thermoplastic resin containing the oxazoline group, there are two types of resins, for example, those wherein the oxazoline group is added to a main chain (skeleton) of a polymer and those containing the oxazoline group at the surface of polymer particles.

The main chain part in those wherein the oxazoline group is added to the polymer main chain is suitably selected from a high molecular weight polymer obtained from a monomer having radical polymeriablity depending upon physical properties to be required. Example of the main chain polymer include polystyrene, acrylonitrile-styrene copolymer, acrylic acid-styrene copolymer, polymethyl methacrylate, polyethyl methacrylate, polybutyl methacrylate, polymethyl acrylate, polyethyl acrylate, polybutyl acrylate and the like. They are used alone or in combination thereof.

The kind of the polymer used in those containing the oxazoline group at the surface of polymer particles is the same as the polymer of those wherein the oxazoline group is added to the surface of polymer particles. Those containing the oxazoline group at the surface of polymer particles are generally used as a dispersion of fine particles having a particle size of 0.05 to 0.1 $\mu$m in water.

The weight-average molecular weight of the polymer which constitutes the main chain or particle in the thermoplastic resin containing the oxazoline group is preferably 100,000 to 500,000. The amount of the oxazoline group is preferably about 1,000 to 15,000 (equivalent molecular weight of a functional group, i.e. oxazoline group).

When the thermoplastic resin containing the oxazoline group is mixed with the ionomer resin with heating, the oxazoline group of the thermoplastic resin reacts with the carboxyl group of the ionomer resin to further improve toughness of the ionomer resin, as described above. As a result, durability of the golf ball is further improved and impact resilience property and hardness are also improved.

Therefore, even if the soft core is used, remarkable deterioration of durability is does not arise and impact resilience and hardness are suitably maintained, whereby a golf ball having excellent hit feeling can be obtained without affecting other properties.

The ionomer resin is mixed with the thermoplastic resin containing the oxazoline with heating under the condition of a resin temperature of 150° to 250° C., using an extruder for plastic or an internal mixer such as plastmill, banbury mixer and the like.

By mixing with heating, bonding is formed by an aminoesterification reaction of the carboxyl group of the ionomer resin with the oxazoline group of the thermoplastic resin containing the oxazoline group, and the thermoplastic resin containing the oxazoline group is micro-dispersed in the ionomer resin.

In order to conduct the above mixing and reaction uniformly and efficiently, it is most suitable to use a biaxial kneading type extruder among the above mixers.

The mixing ratio (weight ratio) of the ionomer resin (A) and thermoplastic resin containing the oxazoline group (B) is preferably in the range of 95:5 to 60:40.

When the mixing ratio of the ionomer resin (A) is larger than the above range, since the amount of the thermoplastic resin containing the oxazoline group (B) is small, sufficient improvement of durability as well as impact resilience and hardness due to the reaction of the thermoplastic resin containing the oxazoline group with the ionomer resin can not be obtained. When the mixing ratio of the ionomer resin (A) is smaller than the above range, the thermoplastic resin containing the oxazoline group (B) constitutes a continuous phase of the mixed system and, therefore, properties such as strength, impact resilience and the like of the ionomer resin per se can not be obtained, sufficiently.

In the present invention, a heated mixture of the ionomer resin and thermoplastic resin containing the oxazoline group is used as the main component of the base resin for the cover. To the heated mixture of the ionomer resin and thermoplastic resin containing the oxazoline group, if necessary, various additives such as pigments, dispersants, antioxidants, UV absorbers, UV stabilizers and the like can be added.

Further, in the present invention, the fact that the heated mixture of the ionomer resin and thermoplastic resin containing the oxazoline group is used as the main component of the base resin for the cover means the case that the base resin for the cover is only composed of the heated mixture of the ionomer resin and thermoplastic resin containing the oxazoline group, or the case that the base resin for the cover is composed of the heated mixture of the ionomer resin and thermoplastic resin containing the oxazoline group, to which other resins are added in an amount within the range which does not affect properties of the heated mixture (normally, in the range of not more than 20% by weight based on the total weight of the heated mixture).

Then, a cover composition which is composed of the heated mixture of the ionomer and thermoplastic resin containing the oxazoline group as the main component is coated on the core to obtain a golf ball.

In that case, any of a solid core and thread wound core can be used. The solid core is obtained by vulcanizing (crosslinking) a rubber composition mainly composed of a rubber followed by integral molding. The thread wound core is obtained by winding a thread rubber on a core material.

According to the present invention, a golf ball having excellent durability as well as excellent impact resilience and suitable hardness can be obtained.

Further, according to the present invention, a golf ball having practical durability, suitable impact resilience and hardness as well as excellent hit feeling can be obtained, because remarkable deterioration of durability does not arise even if a soft core is used and impact resilience and hardness are suitably maintained.

The following Example further illustrate the present invention in detail but are not to be construed to limit the scope thereof.

EXAMPLES 1 TO 6 AND COMPARATIVE EXAMPLES 1 AND 2

(1) Preparation of cover composition

Formulation components shown in Table 1 were mixed and extruded by a twin-screw kneading type extruder to obtain a pellet-like cover composition.

The extrusion was conducted under the condition of a screw diameter of 45 mm, a screw revolution speed of 200 rpm and a screw L/D of 35. A cylinder temperature is as follows.

| Barrel | Temperature (°C.) |
|---|---|
| 1 | 200 |
| 2 | 200 |
| 3 | 200 |
| 4 | 230 |
| 5 | 230 |
| 6 | 230 |
| 7 | 250 |
| 8 | 250 |
| 9 | 250 |
| die | 250 |

TABLE 1

| Cover composition No. | 1 | 2 | 3 | 4 | 5 | 6 |
|---|---|---|---|---|---|---|
| HI-MILAN 1605[1] | 70 | 70 | 70 | 70 | 70 | 70 |
| HI-MILAN 1706[2] | 30 | 30 | 30 | 30 | 30 | 30 |
| EPICROSS RAS1001[3] | 10 | 0 | 0 | 0 | 20 | 0 |
| EPICROSS RPS1001[4] | 0 | 10 | 0 | 0 | 0 | 0 |
| EPICROSS RPS1005[5] | 0 | 0 | 10 | 20 | 0 | 0 |
| Titanium oxide | 1.1 | 1.1 | 1.1 | 1.2 | 1.2 | 1.0 |

[1] Ionomer resin of the type neutralized by sodium ion manufactured by Mitsui Du Pont Polychemicals Co. (melt index: 2.8)
[2] Ionomer resin of the type neutralized by zinc ion manufactured by Mitsui Du Pont Polychemicals Co. (melt index: 0.9)
[3] Acrylonitrile-styrene copolymer having an oxazoline group manufactured by Nippon Shokubai Kagaku Kogyo K.K. [weight-average molecular weight: about 120,000; equivalent molecular weight of polyfunctional group (oxazoline group): about 2,200]
[4] Polystyrene having an oxazoline group manufactured by Nippon Shokubai Kagaku Kogyo K.K. [weight-average molecular weight: about 120,000; equivalent molecular weight of polyfunctional group (oxazoline group): about 11,000]
[5] Polystyrene having an oxazoline group manufactured by Nippon Shokubai Kagaku Kogyo K.K. [weight-average molecular weight: about 140,000; equivalent molecular weight of polyfunctional group (oxazoline group): about 2,200]

(2) Preparation of golf ball

Two kinds of core compositions shown in Table 2 were prepared. The core composition was placed in a mold for core and vulcanized at 165° C. for 20 minutes to prepare a solid core of 38.4 mm in diameter. The core was coated with a cover composition of a formulation shown in Table 1 by a injection molding method and finished through painting and marking processes by a conventional method to prepare a golf ball of 42.8 mm in diameter.

TABLE 2

| Core composition | A | B |
|---|---|---|
| Polybutadiene[1] | 100 | 100 |
| Zinc acrylate | 35 | 25 |
| Zinc oxide | 20 | 23 |
| Dicumyl peroxide | 1.0 | 1.0 |
| Antioxidant[2] | 0.5 | 0.5 |

[1]BR-11 manufactured by Nippon Gosei Gomu K.K.
[2]Yoshinox 425 manufactured by Yoshitomi Seiyaku K.K.

A ball weight, a ball compression, a ball initial velocity and a ball durability of the resulting golf ball were measured. The results are shown in Tables 3 to 5. Further, the ball compression was measured by PGA system and the ball initial velocity and the ball durability were measured as follows.

Ball initial velocity:

By using a swing-robot manufactured by True Temper Co., a golf ball was hit at a club-head speed of 45 m/second with a golf club of No. 1 wood. A ball initial velocity at the moment was measured and the average of 10 balls was determined.

Ball durability:

A golf ball was allowed to bump against a bumping place at a speed of 45 m/second, repeatedly. The number of times at which the ball was broken was determined. The number is represented by the index which is calculated on the basis of the golf ball of Comparative Example 1 being 100.

In Table 3, properties of the golf ball of Example 1 wherein a core composition by which general ball compression can be obtained (i.e. core composition A in Table 2) is used as the core and the golf ball of Comparative Example 1 are shown. Further, the golf ball of Comparative Example 1 is most general golf ball having a conventional constitution wherein an ionomer resin is used as the base resin for cover.

TABLE 3

|  | Example 1 | Comp. Example 1 |
|---|---|---|
| Core composition | A | A |
| Cover composition No. | 4 | 6 |
| Ball weight (g) | 45.3 | 45.3 |
| Ball compression | 102 | 100 |
| Ball initial velocity (m/second) | 252.8 | 252.5 |
| Ball durability | 140 | 100 |

As described above, the golf ball of Comparative Example 1 is most general golf ball having a conventional constitution. As shown in Table 3, regarding the golf ball of Example 1 wherein a core composition which is the same as that of Comparative Example 1 is used, the index indicating ball durability is high as 140 and ball durability is excellent in comparison with the golf ball of Comparative Example 1.

That is, the results shown in Table 3 means the fact that durability of the golf ball wherein the cover composition in the present invention is used is remarkably improved in comparison with the golf ball wherein the cover composition having a conventional constitution is used.

Then, properties of the golf balls of Examples 2 to 6 wherein a core composition by which a soft core, i.e. a core having low compression can be obtained (core composition B in Table 2) and the golf ball of Comparative Example 2 are shown in Tables 4 and 5.

TABLE 4

|  | Example 2 | Example 3 | Example 4 |
|---|---|---|---|
| Core composition | B | B | B |
| Cover composition No. | 1 | 2 | 3 |
| Ball weight (g) | 45.3 | 45.3 | 45.4 |
| Ball compression | 79 | 80 | 82 |
| Ball initial velocity (m/second) | 251.3 | 251.5 | 251.5 |
| Ball durability | 95 | 100 | 100 |

TABLE 5

|  | Example 5 | Example 6 | Comp. Example 2 |
|---|---|---|---|
| Core composition | B | B | B |
| Cover composition No. | 4 | 5 | 6 |
| Ball weight (g) | 45.3 | 45.3 | 45.3 |
| Ball compression | 81 | 83 | 80 |
| Ball initial velocity (m/second) | 251.6 | 251.6 | 251.0 |
| Ball durability | 105 | 108 | 60 |

As shown in Table 5, regarding the golf ball of Comparative Example 2 wherein a soft core having low compression, i.e. a soft core is used and a cover composition having a conventional constitution (cover composition No. 6) is used, the index indicating ball durability is low as 60 and remarkable deterioration of durability is observed in comparison with the golf ball of Comparative Example 1 which is the most general golf ball having a conventional constitution. Thus, it is considered to be of no practical use.

To the contrary, regarding the golf balls of Examples 2 to 6 of the present invention, a soft core which is the same as that of the golf ball of Comparative Example 2 is used, but the index indicating ball durability is about 100 and remarkable deterioration of durability is not observed. Thus, it has practical durability.

Regarding the golf balls of Examples 2 to 6 and the golf ball of Comparative Example 1, professional golfers were asked to hit the golf balls and their evaluations were asked. As a result, hit feeling of the golf balls of Examples 2 to 6 is good in comparison with the golf ball of Comparative Example 1.

By using a swing-robot manufactured by True Temper Co., the golf balls of Examples 2 to 6 and the golf ball of Comparative Example 1 were hit with a golf club of No. 1 wood mo compare an impact force, respectively. As a result, the impact force of the golf balls of Examples 2 to 6 is about 80% of that of the golf ball of Comparative Example 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A golf ball comprising a core and a cover for covering said core, wherein said cover comprises a base resin comprising a mixture of an ionomer resin having at least one carboxyl group, and a thermoplastic resin containing an oxazoline group as a main component microdispersed in said ionomer resin, wherein said mixture has been heated during mixing, and said oxazoline group has reacted with said carboxyl groups of said ionomer resin to form a mixed system with said thermoplastic resin microdispersed in said ionomer resin.

2. The golf ball according to claim 1, wherein said thermoplastic resin containing an oxazoline group is selected from the group consisting of a thermoplastic resin wherein said oxazoline group is attached to a main chain or skeleton of a polymer of said resin and a thermoplastic resin wherein said oxazoline group is at the surface of particles of a polymer of said resin.

3. The golf ball according to claim 2, wherein said polymer of said resin forming said main chain or particles is selected from the group consisting of polystyrene, acrylonitrile-styrene copolymer, acrylic acid-styrene copolymer, polymethyl methacrylate, polyethyl methacrylate, polybutyl methacrylate, polymethyl acrylate, polyethyl acrylate, and polybutyl acrylate.

4. The golf ball according to claim 2 wherein said polymer particles are present in an aqueous dispersion and have a particle size of 0.05 to 0.1 μm.

5. The golf ball according to claim 2, wherein said polymer of said resin forming said main chain or particle has a weight-average molecular weight is 100,000 to 500,000.

6. The golf ball according to claim 1, wherein said oxazoline group is present in an amount of 1,000 to 15,000 (equivalent molecular weight of an oxazoline group).

7. The golf ball according to claim 1, wherein said mixture of said ionomer resin with said thermoplastic resin containing an oxazoline group with heating at a resin temperature of 150° to 250° C.

8. The golf ball according to claim 1, wherein said ionomer resin and said thermoplastic resin containing an oxazoline group are present in a weight ratio within the range of 95:5 to 60:40.

9. The golf ball according to claim 1, wherein said cover further comprises additional components selected from the group consisting of pigments, dispersants, antioxidants, UV absorbers, UV stabilizers and mixtures thereof.

10. The golf ball according to claim 1, wherein said core is selected from the group consisting of a solid core and a thread wound core.

11. The golf ball according to claim 1, wherein said ionomer resin is a resin of a copolymer comprising 10 to 20% by weight of an α,β-unsaturated carboxylic acid having 3 to 8 carbon atoms, and 80 to 90% by weight of an α-olefin, wherein a portion of the carboxyl groups of said copolymer have been neutralized with a metal ion.

12. The golf ball according to claim 11, wherein said metal ion is selected from the group consisting of sodium, lithium, and zinc.

13. The golf ball according to claim 9, wherein said additional components are present in said base resin of said cover.

* * * * *